(12) United States Patent
Axnäs (10) Patent No.: US 8,135,003 B2
(45) Date of Patent: Mar. 13, 2012

(54) COMMUNICATIONS SESSION MANAGEMENT

(75) Inventor: Johan Axnäs, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1118 days.

(21) Appl. No.: 11/919,800

(22) PCT Filed: May 11, 2005

(86) PCT No.: PCT/SE2005/000681
§ 371 (c)(1),
(2), (4) Date: Nov. 2, 2007

(87) PCT Pub. No.: WO2006/121375
PCT Pub. Date: Nov. 16, 2006

(65) Prior Publication Data
US 2010/0075685 A1      Mar. 25, 2010

(51) Int. Cl.
*H04B 7/185* (2006.01)
(52) U.S. Cl. ........ 370/366; 370/442; 370/437; 370/345; 455/450
(58) Field of Classification Search .................. 370/436, 370/441, 468; 714/748
See application file for complete search history.

(56) References Cited

U.S. PATENT DOCUMENTS

| | | | |
|---|---|---|---|
| 5,592,471 A | 1/1997 | Briskman | |
| 5,640,415 A | 6/1997 | Pandula | |
| 6,795,409 B1 | 9/2004 | Youssefmir et al. | |
| 7,333,503 B2 * | 2/2008 | Forssell | 370/436 |
| 2002/0172162 A1 | 11/2002 | Goodings | |
| 2005/0251721 A1 * | 11/2005 | Ramesh et al. | 714/748 |
| 2005/0271006 A1 * | 12/2005 | Chari et al. | 370/329 |

OTHER PUBLICATIONS

Kim,Apparatus and a method for assigning an uplink channel in a mobile communication system, particularly for improving an uplink speed of data Abstracted-Pub-No. KR 2005121892 A.*
Riva, "Performance Analysis of an Improved Dynamic Channel Allocation Scheme for Cellular Mobile Radio Systems", 42nd IEEE Veh. Tech. Conf., pp. 794-797, Denver 1992).*
European official action, Aug. 3, 2009, in corresponding European Application No. 05 742 646.2-2515.
Notification Concerning Transmittal of International Preliminary Report on Patentability in PCT/SE2005/000681 dated Nov. 22, 2007.
English Translation of Chinese official action, Dec. 5, 2011, in Chinese Application No. 200580049723.X.

* cited by examiner

*Primary Examiner* — Seema S Rao
*Assistant Examiner* — Henry Baron
(74) *Attorney, Agent, or Firm* — Nixon & Vanderhye P.C.

(57) ABSTRACT

A scheduling algorithm is disclosed that allows mobile units, participating in an ongoing communications session, to temporary perform channel-demanding communications operations without ending the session and that is useful in the case of no free radio channels. The algorithm is based on selecting a radio channel for transmitting a radio block based on information of a previous radio channel, no which a previous radio block has been transmitted. The radio block and the previous radio block are based on common information. A mobile unit participating in the communications session selects whether to perform any channel-demanding communications operations on the selected radio channel. By limiting any such other channel-demanding operations to only the selected radio channel, the probability of loss of useful data for the mobile unit during the communications session is minimized.

26 Claims, 7 Drawing Sheets

COMMUNICATIONS SESSION MANAGEMENT

This application is the U.S. national phase of International Application No. PCT/SE2005/000681, filed 11 May 2005, which designated the U.S. The entire contents of this application is hereby incorporated by reference.

TECHNICAL FIELD

The technology described in this application generally relates to managing communications sessions in a radio-based communications system, and in particular to enabling other radio channel-demanding communications operations during such communications sessions.

BACKGROUND

Utilization of radio resources and channels is continuously subject to much research and development in order to optimize system throughput despite the limited availability of radio resources in communications systems. This is especially true when introducing new communications services to the exiting communications systems. An example of such new communications service is Multimedia Broadcast Multicast Service (MBMS). The benefit of this MBMS service is that it enables simultaneous distribution of data to several users using the same physical channel, i.e. so-called point-to-multipoint transmission. For more information of MBMS reference is made to the 3GPP document [1].

In order to reach bit rates that are high enough to provide video streaming over MBMS, in particular at or close to the cell borders, in existing GMS (Global System for Mobile communications) and EDGE (Enhanced Data rates for Global Evolution) communications system, it is expected that it will be necessary to use at least four time slots. However, as is well known to the person skilled in the art, the mobile units also have to listen to control channels, e.g. Broadcast Control Channel (BCCH), and perform radio quality measurements, including neighbor cell measurements during the MBMS communications session. This means that due to the multi-slot requirements of MBMS taken together with the control channel listening and quality measurements, the mobile units may have no available communications resources, i.e. time slots, for performing other temporary resource-demanding communications operations during the MBMS session.

For example, assume that a user of a mobile unit that is involved in a MBMS session in the form of receiving video data from a football match or a live TV show. The user might then want to transmit a message, e.g. SMS (Short Messaging Service), MMS (Multimedia Messaging Service) or e-mail message, or initiate a WAP (Wireless Application Protocol) interaction during the MBMS session. The mobile unit typically cannot perform such message transmission or WAP interaction without interrupting the MBMS session, with the result of missed radio blocks for the MBMS session. This is due to that the message transmission or WAP interaction will be performed by the mobile unit on one or more radio channels on which MBMS data will be transmitted.

The missed block reception is in particular a major problem, where the MBMS server typically has one common radio block queue for all (four) time slots and schedule the transmissions on a first-in-first-out basis. This means that a mobile unit that temporarily does not listen to a particular time slot is likely to miss radio blocks belonging to many different LLC (Logical Link Control) blocks. As a result, the throughput on the LLC layer and higher layers will be very low for the MBMS service.

SUMMARY

It is a general object to provide a scheduling of radio block transmissions in a communications session that allows mobile units to perform other communications operations during the session with reduced probability of loss of useful data for the session.

It is another object to provide a scheduling that enables usage of channel-demanding communications operations in a communications session with no free radio channels without unacceptable throughput losses.

Yet another object is to provide a scheduling that can be used by mobile units participating in a communications session for planning other communications operations without having to end the session or miss relevant information.

Briefly, the technology described in this application involves scheduling transmissions of radio block during an ongoing communications session. The scheduling allows mobile units participating in the session to perform other channel-demanding communications operations in cases where there are no free radio channels available for these operations.

In the scheduling, a transmitting network node has transmitted, to at least one mobile unit, a first radio block on a first radio channel belonging to a set of radio channels available for the communications session. This radio block transmission could be a point-to-point transmission. However, the technology described in this application is in particular suitable for point-to-multipoint (broadcast or multicast) transmissions.

A radio channel is then selected from the available radio channel set for transmitting a second radio block, where the second and first radio blocks are based on common information. This radio channel selection is based on information of the radio channel, on which the first radio block was transmitted. The network node thereafter transmits this second radio block on the selected radio channel.

A mobile unit participating in the communications session can then perform any other channel-demanding temporary communications operation on the selected radio channel, which will result in a reduced probability of loss of useful information for the communications session. Since a majority of the mobile units participating in a communications session will, on average, correctly receive and decode the first radio block, these mobile units will not lose any useful information if they perform the temporary communications operations on the radio channel selected for the second block transmission. For these mobile units, the second radio block does not contain any useful information since it is enough that the first radio block and the data contained therein were correctly received. In other words, the mobile unit then actively refrains from listening to all transmissions occasions of a session. However, due to the particular scheduling of the radio blocks, the mobile unit knows that it can afford missing some of the radio blocks and still correctly participate in the session.

The first and second radio blocks are based on common information. In an implementation, the second radio block comprises at least a portion of the information bits of the first radio block, e.g. by being a copy of the first radio block. In another implementation, the second radio block includes incremental redundancy related to the information in the first radio block.

The available radio channels of set can be organized into at least a first channel subset and a second channel subset. Assume that the first radio block was transmitted using a radio channel from the first subset. In high radio quality situation, it is typically advantageous to select a radio channel for the second radio block among the radio channels of the second subset. Thus, mobile units experiencing a high radio quality and are, on average, expected to correctly decode information based only on a single transmission occasion could then listen to only radio channels from the first subset. As a result, the radio channels of the second subset that are employed by the network node for retransmitting information could then be used by the mobile unit for performing any other temporary communications operation.

In low quality situation and in particular in situations with high acceptable control frame losses, all radio blocks belonging to a particular control frame, including those radio blocks that carry information that already has been transmitted using at least one previous radio block, are preferably transmitted using radio channels of a same channel subset. This is especially the case, where a control frame could be correctly received if, and only if, the mobile unit successfully received and decoded all, or at least a minimum portion of, the radio blocks belonging to the control frame. Thus, if a given mobile unit already has failed to correctly decode a radio block of a particular control frame, it might be pointless for the mobile unit to try to decode any remaining radio blocks belonging to this control frame. In such a case, the mobile unit can perform temporary communications operations on the radio channels of the relevant subset, which will be used for transmitting of the failed control frame.

As different scheduling solution can be advantageous at different link quality situations, also link quality data can be used together with the information of the radio channel used for the first radio block when selecting a suitable radio channel for the second subsequent radio block.

The temporary channel-demanding communications operations include setting up a temporary block flow, by e.g. transmitting an SMS, MMS or e-mail message. An additional example of a possible TBF is if the mobile unit initiates a WAP interaction during the communications session. Also control channel listening and quality measurements are communications operations that requires radio channel for the performance and could be performed during an ongoing communications session.

The technology described in this application offers the following advantages:
 Improves the possibility of introducing multi-resource demanding communications services into communications systems with limited radio resources;
 Allows usage of resource-demanding communications operations during ongoing communications sessions without any loss of useful information or with reduced probability of loss of useful information;
 Improves the system robustness and throughput in situations with no additional free radio resources except those used for an ongoing communications session; and
 Provides information that can be used by mobile units participating in a communications session for scheduling temporary resource-demanding communications operations at the best possible occasions.

Other advantages will be appreciated upon reading of the below description of the non-limiting, example embodiments.

DETAILED DESCRIPTION OF NON-LIMITING EMBODIMENTS

Throughout the drawings, the same reference characters will be used for corresponding or similar elements.

The technology described in this application relates to management of communications sessions and scheduling of transmissions in such sessions, and in particular, enables utilization of temporary radio-channel-demanding communications operations during such sessions with reduced (minimized) loss of data for the sessions due to the temporary communications operations.

Figure 1:
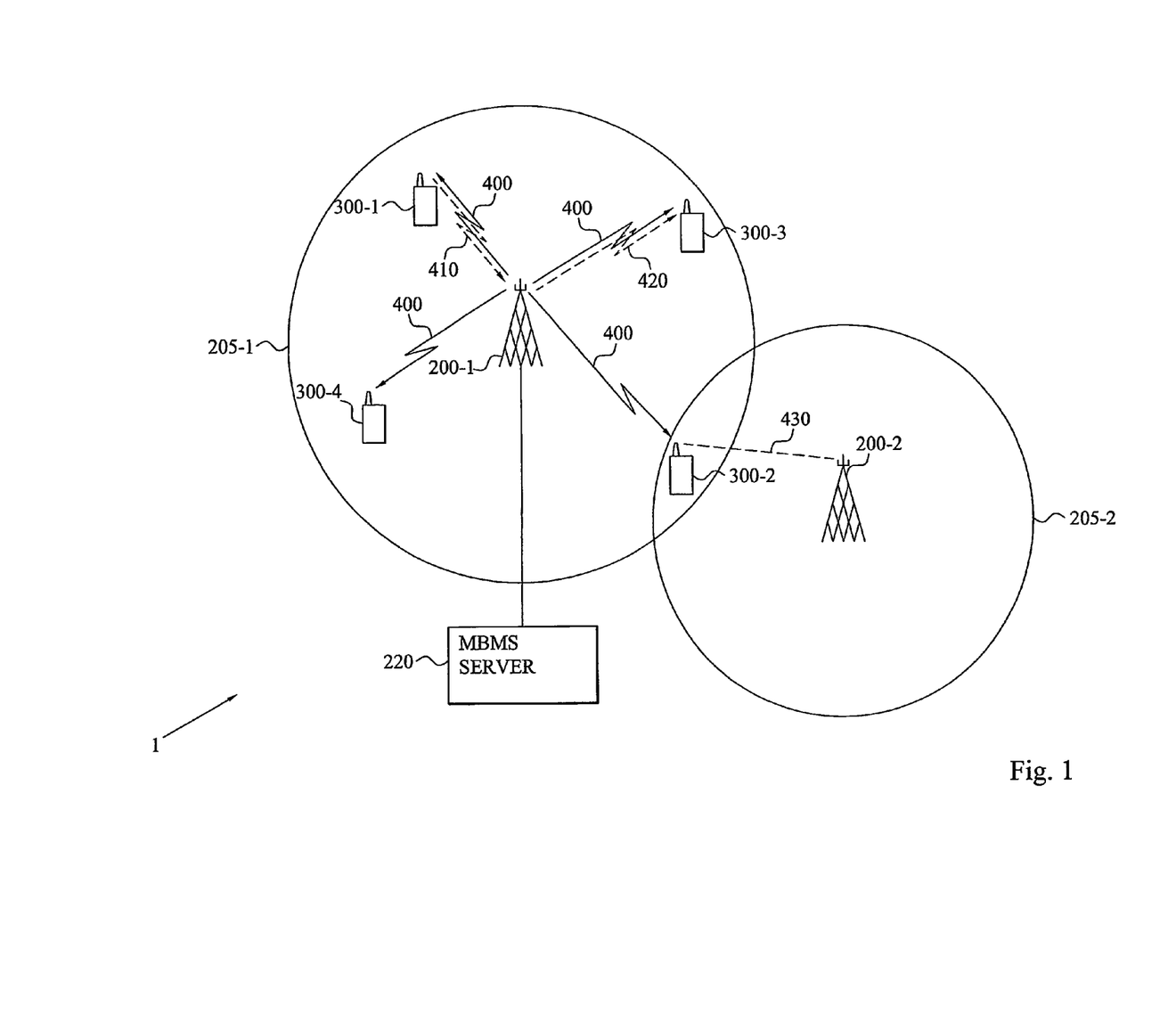
FIG. 1 is an overview of a portion of a communications system.

FIG. 1 is a schematic overview of a portion of a communications system 1. In this illustrative system 1, four mobile units 300-1 to 300-4, present in the radio coverage area 205-1 of a network node or base station 200-1, are involved in a communications session with the base station 200-1. The communications session could be a broadcast and/or multicast (point-to-multipoint) service, such as Multimedia Broadcast Multicast Service (MBMS). However, the technology described in this application is not limited thereto, but can generally be applied to any form of communications service, including unicast (point-to-point) services, and in particular to services requiring multiple radio channels or resources and, furthermore, services without or with limited acknowledgement possibilities, as will be discussed further below.

In the communications system 1 of FIG. 1, the base station 200-1 receives MBMS data from an associated or connected MBMS server 220 and transmits this data in the form of radio blocks or packets in a point-to-multipoint manner on a (same physical) channel 400 to the mobile units 300-1 to 300-4 participating in the MBMS session.

During this MBMS session, one or multiple mobile units 300-1 to 300-3 might want to perform other temporary radio-channel demanding communications operations during the MBMS session, without having to end and subsequently re-initiate the session. These temporary operations are communications operations that require one or multiple radio channels or resources for their executability. In addition, the communications operations are temporary in the sense that their duration is instant or limited over time, so that they at least can be initiated and preferably ended before the completion of the MBMS session.

An example of such temporary channel-demanding operation is setting up a temporary block flow (TBF), as represented by 410 in the figure. For example, the mobile unit 300-1 might, during the MBMS session, transmit a message 410, e.g. a SMS (Short Messaging Service), MMS (Multimedia Messaging Service) or e-mail message. An additional example of a possible TBF is if the mobile unit 300-1 wants to initiate a WAP (Wireless Application Protocol) interaction 410 during the MBMS session.

In a further example, the mobile unit 300-3 is required or wants, during the MBMS session, to listen to a control channel 420, e.g. a Broadcast Control Channel (BCCH). An additional example is when the mobile unit 300-2 needs to perform quality measurements 430, illustrated by neighboring cell measurements for the mobile unit 300-2 that is also present within the radio coverage area 205-2 of a neighboring base station 200-2.

In either of these cases, such a messaging or WAP interaction 410, control channel listening 420 and quality measuring 430 temporarily takes possession of a number of radio channels or resources. If there are free radio channels available, there is generally no problem since the mobile units 300-1 to 300-3 can then perform these temporary communications operations on the available radio channels and still receive the MBMS data 400 on the radio channels dedicated for the MBMS session. However, in cases when there is no available radio channel, due to that the MBMS service or the MBMS service and some other communications service use all radio channels dedicated to the base station 200-1, the mobile units 300-1 to 300-3 will not be able to listen to and receive the MBMS data 400 simultaneously as they perform the temporary communications operation 410 to 430. As a result, radio blocks containing MBMS data will be lost, lowering the system throughput.

The technology described in this application, however, provides an efficient scheduling of radio block for the ongoing communication session, e.g. MBMS session, which allows mobile units 300-1 to 300-3 participating in the session to perform channel-demanding temporary communications operations 410 to 430 but with no loss of data or only low probability of loss of data for the session. As a consequence, the system robustness and throughput is improved compared to conventional scheduling under these situations.

The scheduling utilizes retransmission of information and scheduling of such retransmissions based on previous transmissions.

For some communications services and systems, feedback trafficking in the form of acknowledgement (ACK) and negative acknowledgement (NACK) can be used. In such a feedbacking, a mobile unit that did not successfully receive a radio block can inform the base station thereof and request a retransmission of the radio block. However, since the number of mobile units within a cell that (simultaneously) can conduct such ACK/NACK feedback is limited (typically 16), such feedback solution is of low or no use for MBMS and other broadcast and multicast services, where the average number of mobile units simultaneously participating in a broadcast/multicast session is expected to be larger (probably several tens of mobile units) than the maximum number of allowed feedbacking units. The solution to this problem with lack of feedback is to retransmit the broadcast/multicast information a number of times, e.g. once, allowing the mobile units at least one additional opportunity of receiving the information.

Traditional scheduling of broadcast/multicast services typically involves transmitting all radio blocks in the transmit buffer in a first-in-first-out order, followed by re-transmitting the radio blocks in the same order. Thus, such scheduling does not use any information of the radio channels of the previous (original) radio block transmission when selecting radio channels for the subsequent retransmissions.

Figure 2:
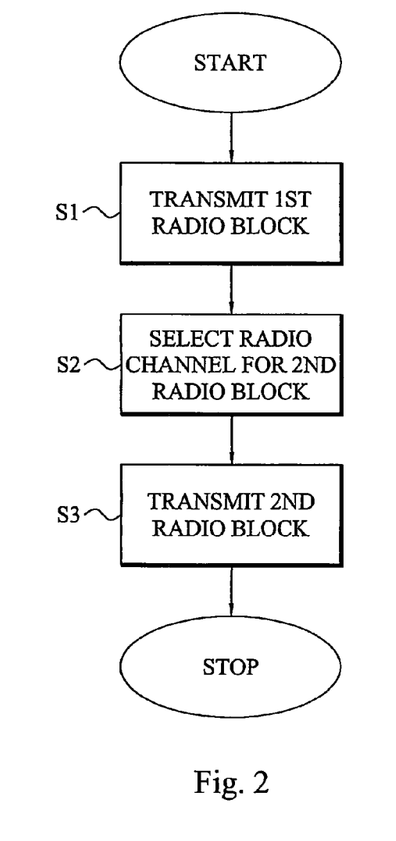
FIG. 2 is a flow diagram of the method enabling channel-demanding communications operations during an ongoing communications session.

FIG. 2 is a flow diagram of a scheduling method for enabling temporary channel-demanding communications operations for mobile units during an ongoing communications session that involves transmission of radio blocks to the mobile units on a set of multiple available radio channels.

The method starts in step S1, where a transmitting network node transmits, to at least one mobile unit, a first radio block on a first radio channel belonging to the available radio channel set. This radio block transmission could be a point-to-point (unicast) transmission or a point-to-multipoint (broadcast or multicast) transmission. This first radio block carries (payload) information associated with the ongoing communications session.

In a next step S2, a radio channel is selected from the available radio channel set for transmitting a second radio block, where the second and first radio blocks are based on common information. Thus, in a first implementation, the second radio block could be a copy of the first radio block, i.e. comprising the same payload information as the first radio block, though potentially being modulated and/or coded differently. In another implementation, the second radio block comprises a portion of the information of the first radio block. For example, the second radio block could include a first portion that contains the same information bits as included in apart of the first block and a second (remaining) portion that contains other information bits. In yet another implementation, the second radio block includes incremental redundancy related to the information in the first radio block. radio blocks are based on common information. Thus, in a first implementation of the invention, the second radio block could be a copy of the first radio block, i.e. comprising the same payload information as the first radio block, though potentially being modulated and/or coded differently. In another implementation, the second radio block comprises a portion of the information of the first radio block. For example, the second radio block could include a first portion that contains the same information bits as included in a part of the first block and a second (remaining) portion that contains other information bits. In yet another implementation, the second radio block includes incremental redundancy related to the information in the first radio block.

In either case, the radio channel selection of the step S2 is based on information of the radio channel, on which the first radio block was transmitted. As will be further discussed herein, also other data than the information of the previous radio channel can be used in this selection process. In a following step S3, the network node transmits this second radio block on the selected radio channel. This second block transmission is preferably, but not necessarily, performed using a same transmission technique as the first block transmission, i.e. preferably being unicast (or multicast or broadcast) if the first transmission was unicast (or multicast or broadcast). Note further, that the modulation and/or coding used in the two transmissions may differ.

This scheduling of radio block transmissions, allows mobile units participating in the communications session and wanting to perform any other channel-demanding temporary communications operation to selected a suitable radio channel to perform the communications operation on. As a result, the probability of loss of information for the communications session will be reduced compared to prior art systems with no special radio block scheduling and channel selection. Since a majority of the mobile units participating in a communications session will, on average, typically correctly receive and decode the first radio block, these mobile units will not lose any useful information if they perform the temporary communications operations on the radio channel selected for the second block transmission. For these mobile units, the second radio block does not contain any useful information, since it is enough that the first radio block and the data contained therein was correctly received. Thus, even though a few mobile units might, because of unsuccessful reception of the first radio block, lose the information of the second radio block due to the temporary communication operation, the number of mobile units that will lose this information is markedly reduced (over time) compared to the prior art solutions with no active selection of radio channels for retransmissions. As a result, the system throughput and robustness will increase.

Note further that only mobile units that are required to or wants to perform other channel-demanding communications operations should perform such operations on the radio channel employed for the second radio block. As a result, in a typical broadcast or multicast session with a plurality of participating (listening) mobile units, all of these mobile units may perform any temporary communications operations using this radio channel. In reality, though, typically only a small portion of the mobile units will actually perform the temporary operations.

The mobile units performing a temporary channel-demanding operation using the radio channel employed for the transmission of the second radio block are preferably mobile units that correctly received and decoded the first radio block. As the second radio block will typically not contain any useful information for these mobile units, the temporary operations can be performed without loss of any useful payload for the communications system and, thus, without any loss of throughput. However, it could be advantageous to perform the temporary operations on the second radio channel and, thus, omit from receiving the second radio block even for mobile units that did not successfully receive and decode the first radio block. This is particularly the case, where multiple radio blocks belong to and are organized into a larger control frame or block. In such a case, a control frame could be correctly received if, and only if, the mobile unit successfully received and decoded all, or at least a minimum portion of, the radio blocks belonging to the control frame. Thus, if a given mobile unit already has failed to correctly decode a radio block of a particular control frame (including failed decoding of any retransmitted version of the radio block), it might be pointless for the mobile unit to try to decode any remaining radio blocks belonging to this control frame. In such a case, the mobile unit can perform temporary communications operations on the radio channels, which will be used for transmitting and retransmitting information of the failed control frame.

The scheduling algorithm presented in FIG. 2, thus, provides a scheduling of radio blocks during a communications session that enables mobile units to temporarily stop receiving radio blocks and instead perform other temporary communications operations on the radio channel(s), which they temporarily stopped listening to. By performing these temporary operations on only a selected portion of the radio channels used for the communications session, the omission of reception of radio blocks will not do any harm, or only slight harm, in the sense of missed information for the mobile units. As a consequence, the system throughput will not be reduced, or only reduced slightly, compared to a communications system prohibiting performance of temporary channel-demanding communications operations during a communications session where there are no free radio channels available.

The resulting system throughput and robustness will be much larger compared to corresponding communications systems, where mobile units more or less randomly can perform temporary communications operations on any of the radio channels used in the communications session. Such a solution will result in that the mobile units on average will lose more data and information transmitted in the session compared to employing the technology described in this application.

The method then ends.

In the following the technology described in this application will be illustrated by way of examples of a GSM (Global System for Mobile communications) and/or EDGE (Enhanced Data rates for Global Evolution) communications system. However, the technology described in this application is not limited thereto.

The radio channels used for the ongoing communications session and also temporary used for the other communications operations can generally be any communications resources used for communicating radio blocks between a transmitting node to a receiving unit over the air interface. A non-limiting example of such a radio channel that will be used as an illustrative embodiment in the following discussion is a time slot.

Figure 3:
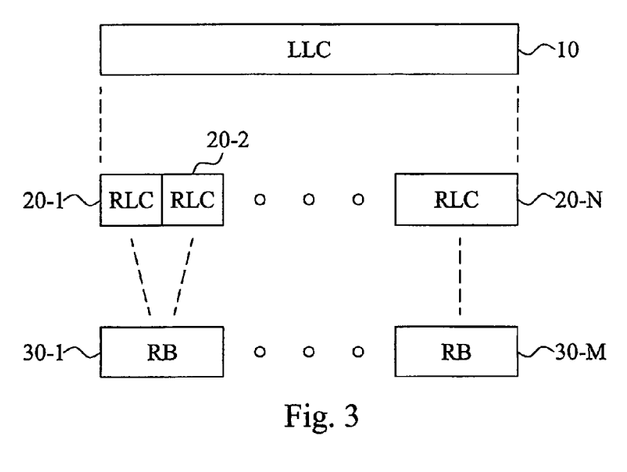
FIG. 3 illustrates a possible relation between radio blocks and different control blocks in a communications system.

FIG. 3 illustrates a possible relation between radio blocks 30-1-to 30-M and different control blocks 10; 20-1 to 20-N in a GSM/EDGE communications system. As is well known to the person skilled in the art, data or information, e.g. MBMS data, to be transmitted to mobile units is organized into LLC (Logical Link Control) blocks or frames 10 including multiple information bits. Such an LLC frame 10 is in turn divided into multiple RLC (Radio Link control) blocks 20-1 to 20-N of possibly different sizes. The RLC blocks 20-1 to 20-N are packed into data or radio blocks 30-1 to 30-M that might have fixed "raw bit size". As a consequence of the potentially different sizes of the RLC blocks 20-1 to 20-N, a radio block 30-1, 30-M can include one 20-N or multiple, typically up to two, 20-1, 20-2 RLC blocks. A radio block 30-1 to 30-M is then transmitted over four radio bursts in four consecutive TDMA (Time Division Multiple Access) frames. This means that when the technology described in this application is applied to this particular example of communications system, the set of four radio bursts (or the time slot position within TDMA frames), on which the second radio block should be transmitted, is selected based on information of the set of four bursts (time slot positions) of the first radio block.

Figure 4:
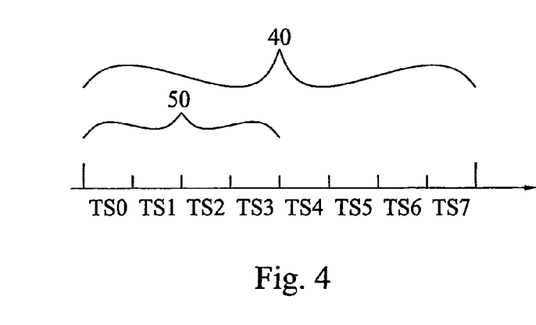
FIG. 4 illustrates the organization of time slots and available time slots in a communications system.

FIG. 4 schematically illustrates a TDMA frame 40 containing a maximum number of bursts, here labeled according to the respective time slot TS0 to TS7 to which they belong. A set 50 of multiple time slots of the maximum number of time slots 40 is allocated for the communications session and will be used for transmitting and retransmitting radio blocks. This time slot set 50 could include all the time slots TS0 to TS7, or a portion thereof TS0 to TS3 as illustrated in the figure. Note that the time slots of the set 50 do not necessarily have to be consecutive time slots as illustrated in the figure, but can in principle actually be any composition of at least two of the time slots TS0 to TS7.

If the allocated time slot set 50 contains fewer than the maximum number of time slots 40, any remaining time slots TS4 to TS7 could potentially be used by the mobile units for the desired temporary communications operations described above. However, for some reasons these other time slots TS4 to TS7 might not be available to the mobile unit, e.g. used for other communications services, further control channel listening and quality measuring. Alternatively, or in addition, one or multiple time slots could, at least temporarily, experience such high interference levels that it/they will be unusable for any communications operations. In these situations, and in the case the communications session uses all time slots TS0 to TS7, the slot-demanding temporary communications operations have to be performed on one or some of the time slots of the set 50.

In the following illustrative examples, the expression "first radio block" denotes a radio block that contains a number of information bits and that is transmitted to at least one mobile unit participating in the communications session with a network node. A "second or further radio block" denotes a radio block that is a copy of the first radio block, i.e. carries the same information bits as the first radio block. As was noted above, this should however merely be seen as an illustrative example of the information relationship between the first radio block and the second radio block, as the main requirement is that the first and second radio block are based on common information.

In FIGS. 5A to 5D, RB n, where n=1 to M, denotes a so-called first radio block and RB n' denotes the retransmitted version of the radio block RB n, i.e. is a so-called second or further radio block.

Figure 5A:
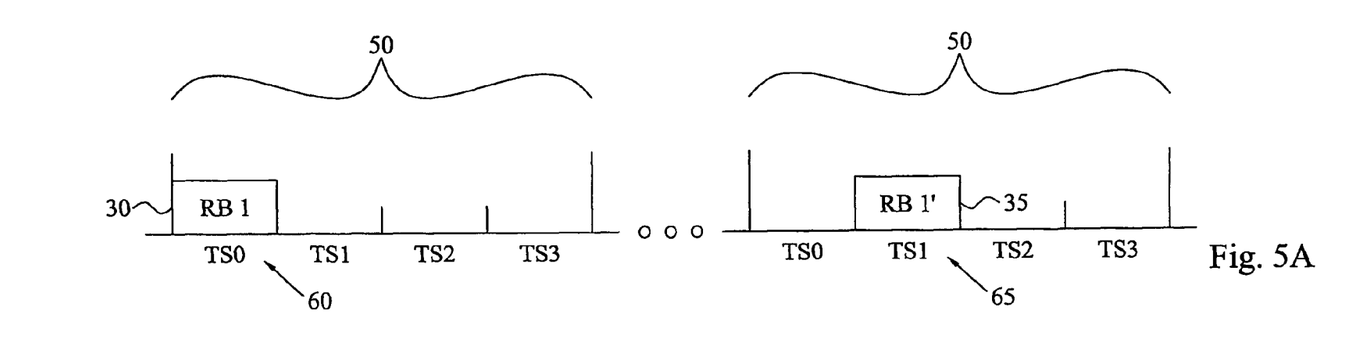
FIGS. 5A-5D illustrate different embodiments of scheduling radio block transmissions.

FIG. 5A illustrates an example of scheduling radio block transmissions. In this figure, the set 50 of time slots dedicated to the ongoing communications session includes the time slots TS0 to TS3. The network node transmits a first radio block 30 to at least one mobile unit during a first time slot 60. A selection of suitable time slot for a transmission of a second radio block 35, i.e. a retransmission of the first radio block 30 in this illustrative example, is then based on information of this first time slot 60. In this scheduling embodiment, any radio block 35 that carries information that previously has been transmitted is scheduled on a time slot 65 of the set 50 different from the time slot 60 used for the previous original transmission of the (same) information. This means that if the first time slot TS0 of the set 50 is used for the first radio block 30, the second radio block 35 and any further retransmission of the first block 30 will be transmitted on any of the remaining time slots TS1 to TS3 of the set 50. Note that the time slot 65 for the second radio block 35 can be a time slot in the same TDMA frame as the time slot 60 for the first radio block 30 or a time slot in a subsequent TDMA frame.

In the case of further transmissions of the first radio block 30, these could be transmitted on the time slot 65 selected for the second radio block 35 and/or any of the other remaining time slots TS2 and TS3.

Figure 5B:
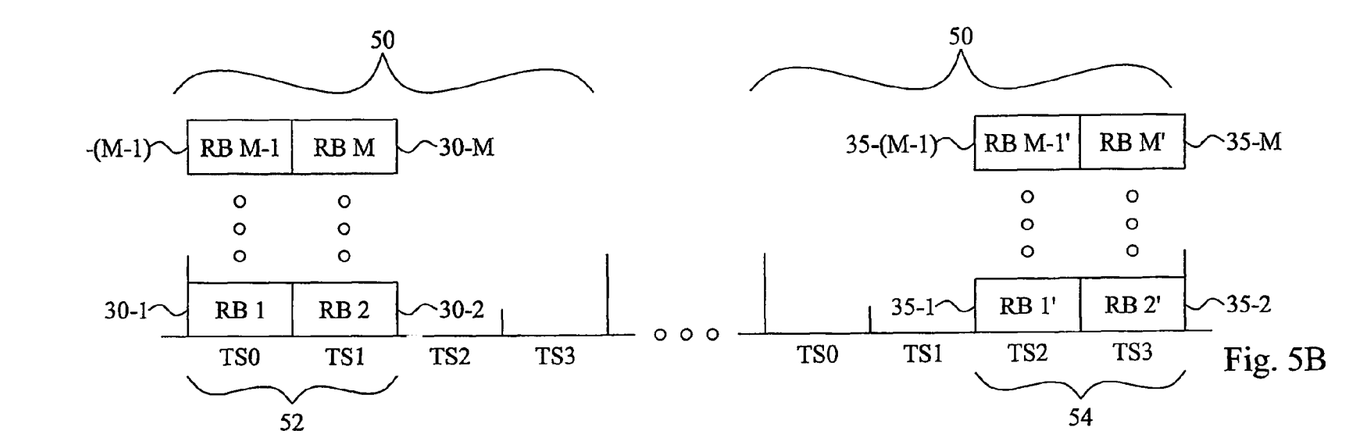

This principle can be extended to the case with multiple so-called first radio blocks 30-1 to 30-M in FIG. 5B. In this extension, the available time slots TS0 to TS3 are organized into at least a first time slot subset 52 and a second time slot subset 54. The first time information is transmitted in a radio block 30-1 to 30-M to at least one mobile unit, the transmission is conducted on a time slot TS0 and TS1 selected from the first subset 52. Any further transmissions of the information, i.e. the transmission of the second radio blocks 35-1 to 35-M, are performed on a time slot TS2 and TS3 selected from the second subset 54.

This means that a mobile unit that is currently experiencing a relative high radio quality generally only has to listen to the time slots TS0 and TS1 of the first subset 52 and will still being able to correctly receive and decode the relevant data during the communications session. Thus, such a mobile unit does not need to receive the further transmissions of the information and can omit from receiving the second and subsequent radio blocks 35-1 to 35-M. As a consequence, the time slots of the second subset 54 are available for such a mobile unit to perform the other temporary slot-demanding communications operations.

Mobile units experiencing a relatively lower radio quality and, thus, probably not being able to correctly decode the information carried by all the first radio blocks 30-1 to 30-M, has a choice between listening to further transmissions of the information, i.e. by receiving second transmissions of the information 35-1 to 35-M on time slots TS2 and TS3 of the second subset, or performing the temporary communications operations on these time slots TS2 and TS3.

Note that the choice of whether to perform other temporary communications operations on the time slots TS2 and TS3 of the second subset 54 at the expense of missing the information carried by the second radio blocks 35-1 to 35-M need not be fixed. Thus, the mobile unit may decide not to stop listening completely to these time slots TS2 and TS3, but just listening less often to them so that it every now and then can perform the temporary slot-demanding operations on those time slots TS2 and TS3.

Figure 5C:
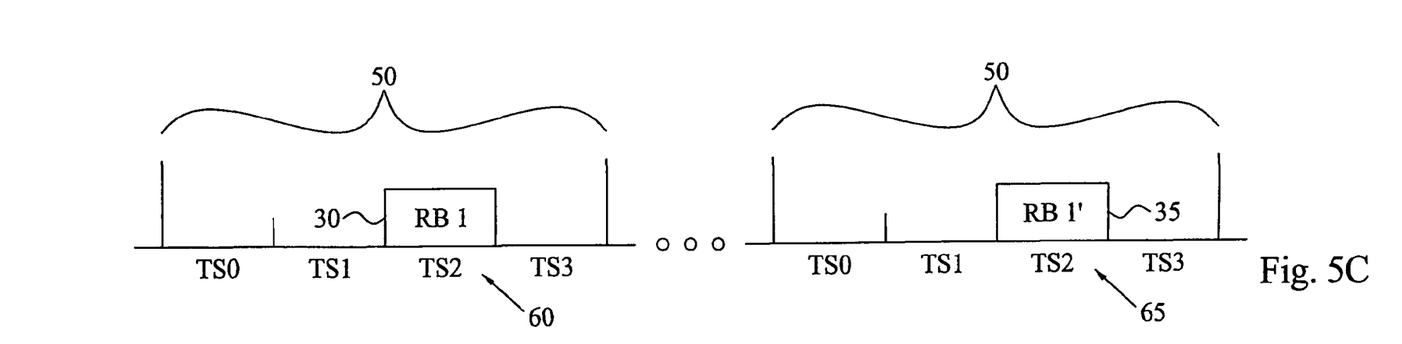

FIG. 5C illustrates another example of scheduling. Correspondingly to FIG. 5A, the network node transmits a first radio block 30 to at least one mobile unit during a first time slot 60. A selection of suitable time slot for a transmission of a second radio block 35 that comprises the same information as the first radio block 30 is then based on information of this first time slot 60. Contrary to the scheduling embodiment of FIG. 5A, any radio block 35 that carries information that previously has been transmitted is scheduled on a same time slot 65 of the set 50 as the time slot 60 used for the previous (original) transmission of the (same) information. This means that if the first radio block 30 was transmitted over four radio bursts in four consecutive TDMA frame denoted time slot TS2, the second radio block 65 will be also be transmitted over four radio bursts in four consecutive TDMA frames corresponding to the same position in the TDMA frame as time slot TS2. Thus, in this embodiment, second and further transmissions of radio blocks 35 are transmitted using a same time slot 65 that was used for the first radio block 30 but in a subsequent TDMA frame.

This scheduling embodiment can be extended by organizing the available MBMS-dedicated time slots 50 into at least a first slot subset and a second slot subset. The second and any further transmissions of radio blocks 35 are then performed on a time slot 65 selected from the same subset as the time slot 60, on which the first radio block 30 was transmitted.

As was discussed in connection with FIG. 2, radio blocks 30-1 to 30-M are typically organized or regarded as belonging to an LLC frame 10. If a mobile unit has failed to successfully receive one or more radio blocks of a particular LLC frame, and re-transmissions of this (these) radio block(s), the mobile unit typically has nothing to gain to try to receive and decode any remaining radio blocks of that LLC frame, since an LLC frame is typically only successfully received and meaningful if the mobile has correctly received all radio blocks, or at least a minimum amount of radio blocks, of that LLC frame.

Figure 5D:
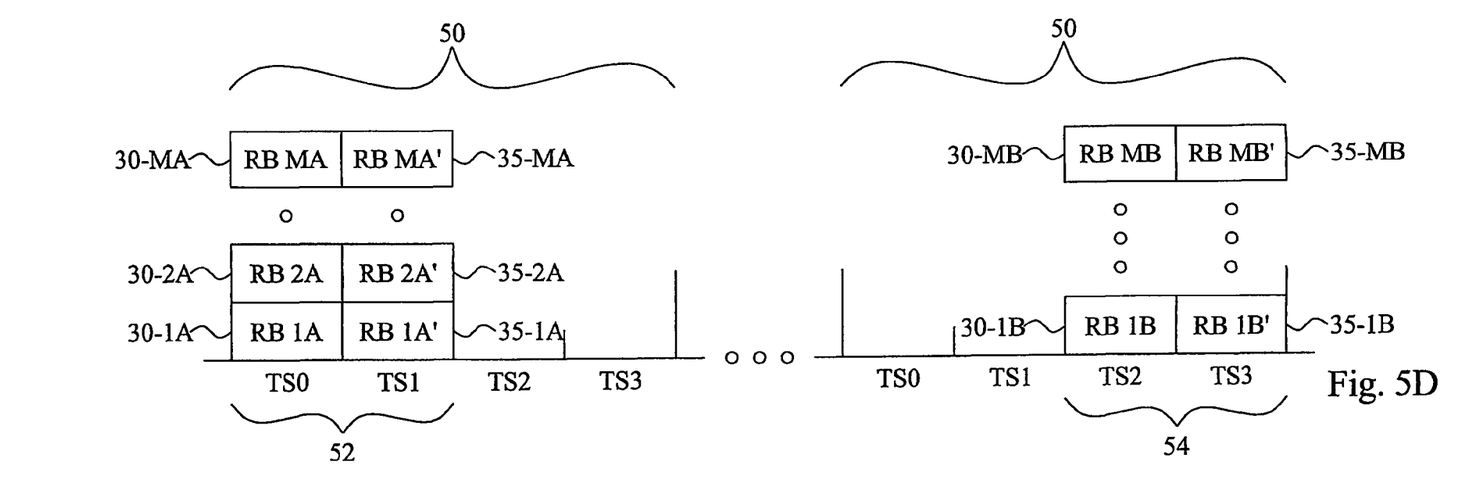

In a further embodiment of the scheduling in FIG. 5D, the time slots TS0 to TS3 available for the communications session are organized into at least two slot subsets 52 and 54. The network node then transmits all radio blocks 30-1A to 30-MA (30-1B to 30-MB) belonging to a same LLC frame A (B) on time slots TS0 and TS1 (TS2 and TS3) belonging to a same subset 52 (54). This means that based on the information of the time slot TS0 (TS2) used for transmission of the first radio block(s) 30-1A to 30-MA (30-1B to 30-MB) and based on the organization of time slots, the network node schedules the transmissions of the second radio block(s) 35-1A to 35-MA (35-1B to 35-MB) on a time slot TS0, TS1 (TS2, TS3) belonging to the same subset 52 (54) as the time slot TS0 (TS2) used for the first radio block(s) 30-1A to 30-MA (30-1B to 30-MB). If a subset 52 (54) includes multiple time slots TS0 and TSI (TS2 and TS3), any of these time slots TS0 and TSI (TS2 and TS3) can be used for the second radio block(s) 35-1A to 35-MA (35-1B to 35-MB), including the time slots TS0 (TS2) used for the first radio block(s) 30-1A to 30-MA (30-1B to 30-MB).

This means that if a mobile unit was not able to correctly receive a first radio block, e.g. the radio block 30-1A, and its corresponding retransmitted version 35-1A, the mobile unit can refrain from listening to the remaining radio blocks 30-2A to 30-MA and their retransmitted versions 35-2A to 35-MA. Since these remaining radio blocks 30-2A to 30-MA, 35-2A to 35-MA will, in this embodiment, all be transmitted on time slots TS0 and TS1 of the first subset 52, the mobile unit can perform any other temporary communications operations on the these time slots TS0 and TS1 as long as the network transmits radio blocks 30-2A to 30-MA, 35-2A to 35-MA belonging to the same LLC frame on these time slots TS0 and TS1.

Note that a given slot subset 52; 54 can be used for transmissions, including retransmissions, of radio blocks belonging to more than one LLC frame. For example, in the situation with four LLC frames, where LLC n, n=1-4, contains Mn different radio blocks and each such radio block is retransmitted once, the time slots TS0 and TS1 of the first subset 52 could be used for transmitting the 2×M1+2×M3 radio blocks of the LLC frame 1 and 3, whereas the time slots TS2 and TS3 of the second subset 54 may then be used for the 2×M2+2× M4 radio blocks of the LLC frame 2 and 4.

In this way a mobile unit that only listens to e.g. the time slots TS0 and TS1 of the first subset 52 can potentially be guaranteed to be able to receive all LLC frames transmitted on that time slot subset 52. This scheduling scheme is expected to be most useful for communications sessions in which rather high LLC block error rates are acceptable.

The embodiments discussed above in connection with FIGS. 5B and 5D can be combined. Assume that a first slot subset 52 includes the time slots TS0 and TS1 and a second slot subset 54 includes the remaining time slots TS2 and TS3 available for the communications session. Radio blocks belonging to e.g. LLC frame 2k-1, where k=1, 2, . . . could then be transmitted using the time slots TS0 and TS1 of the first subset 52. Correspondingly, radio blocks belonging to LLC frame 2k will be transmitted on the time slots TS2 and TS3 of the second subset 54. Furthermore, first time information belonging to LLC frame 2k-1 is transmitted, i.e. transmission of first radio blocks of LLC frame 2k-1, the time slot TS0 of the first subset 52 could be used. Any retransmissions of the this information, i.e. transmission of second radio blocks of LLC frame 2k-1, the other time slot TS1 of the first subset 54 is used. The corresponding discussion is then typically applied to the LLC frame 2k transmitted using the second subset 54. Thus, first radio blocks of LLC frame 2k are transmitted on e.g. time slot TS2 and retransmissions of these radio blocks of LLC frame 2k are performed on time slot TS3. In the case of more than two subsets of time slots, a first subset could be used for first radio blocks of LLC frame 2k-1, a second subset is used for second radio blocks of LLC frame 2k-1, a third subset is used for first radio blocks of LLC frame 2k and finally a fourth subset is used for second radio blocks of LLC frame 2k.

In the embodiments discussed above in connection with FIGS. 5B and 5D, the second radio blocks are transmitted on time slots of the same or different subset as the first radio blocks or alternatively on different time slots or on time slots of a different subset as the first radio blocks. If the same particular scheduling will be used throughout the communications session, it may be enough to only notify one selected radio channel to the mobile units. These mobile units can then from this notification and from the information of subset definition conclude how any remaining radio block transmissions will be performed.

The two different scheduling embodiments discussed above, i.e. scheduling retransmissions on the same time slot or on time slots of the same subset versus scheduling retransmissions on other time slots or on time slots of another subset, are typically useful in different radio conditions, i.e. high versus low block error rates. As a consequence, radio quality information can advantageously be used together with information of the time slot used for the previous (first) radio block when selecting suitable time slot for the subsequent (second) radio block.

Figure 6:
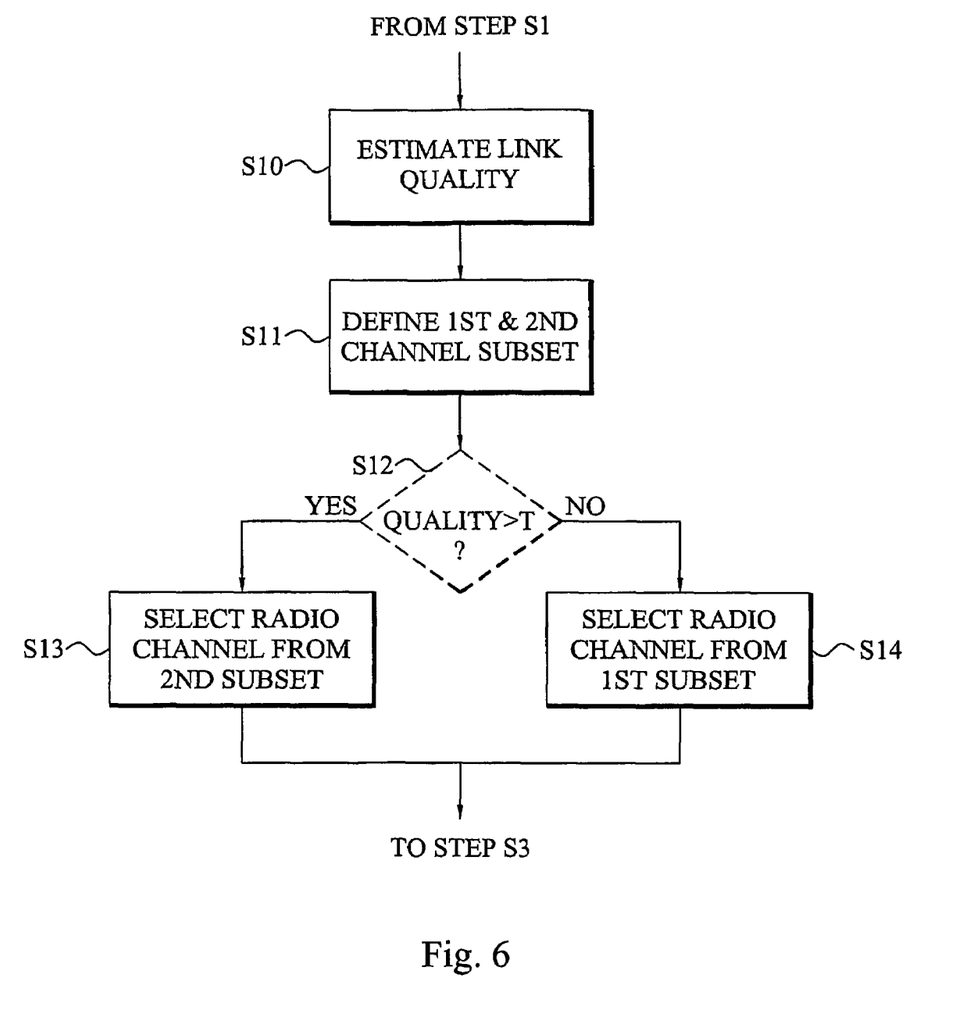
FIG. 6 is a flow diagram illustrating an example embodiment of the selecting step of FIG. 2 in more detail.

FIG. 6 illustrates a flow diagram of an embodiment of the selecting step S2 of FIG. 2 that uses quality information in the selection process. The method continues from step S1 of FIG. 2. In a next step S10, link or radio quality data for the communications link between the transmitting network node and the mobile unit is estimated. In connection to this embodiment, any quality data that is representative of or at least indicative of the link quality can be used, including, but not limited to, C/I (carrier-to-interference ratio), BER (bit error rate), BLER (block error rate), BEP (bit error probability) BLEP (block error probability), etc. The link quality data, that could contain different quality parameters, can be estimated by the mobile unit and communicated to the network node performing the radio channel selection. Alternatively, or in addition, the network node (base station) communicating directly with the mobile unit can estimate the quality data or at least a portion thereof.

The link quality data could be estimated each time a selection of radio channel for a second radio block is to be performed. Alternatively, the quality estimation could be performed more or less often. For example, the link quality measurements that are typically conducted during a communications session could be used in the selection process.

In a next step S11, at least a first and a second radio channel subset is defined for the radio channels dedicated to the communications session and radio block transmission. The two subsets could be of equal or different size, i.e. include the same or different numbers of radio channels. The particular radio channel(s) belonging to the subsets could be fixed. Alternatively, the radio channel subset definition could be adapted during the communications session, for example in response to the addition or removal of a dedicated radio channel to use for or previously used in the communications session. The channel subset definition could also, in some implementations, be dynamically adapted based on the current traffic situations. In such a case, the number of radio channels in the different subsets could be adapted based on the current radio quality situation and/or based on the estimated number of mobile units that are expected to perform other temporary communications operations during the communications session.

In FIG. 6 it is assumed that the subset definition is conducted so that the radio channel used for transmitting the first radio block belongs to the first radio channel subset. This should, though, merely be seen as an illustrative, non-limiting, example as this particular radio channel likewise instead could belong to the second or another (in the case of more than two subsets) subset.

The estimated link quality from the base station and/or mobile unit is then used together with information of the radio channel used for transmitting the first radio block in selecting a radio channel for the second radio block. This is preferably implemented as illustrated in step S12 by comparing the link quality data with a quality threshold. If the quality data indicated by a current link quality is higher or better than the link quality represented by the threshold, the selection is performed according to step S13 otherwise it is performed according to step S14.

Thus, if the mobile unit is currently experiencing a relatively good link quality (link quality>threshold in the case of a large link quality value represents a good experienced radio quality, otherwise link quality<threshold), the radio channel for the second radio block is selected from the second subset in step S14. Thus, in this high quality situation, the second radio block will be transmitted using a different radio channel than was used for the first radio block. Mobile units that correctly received the first radio block, due to their high experienced radio quality, can then use the all the radio channels of the second subset for any other temporary communications operations.

If however a mobile unit is currently experiencing a relative poor link quality (link quality<threshold) so that the possibility that the mobile unit will not correctly receive and decode neither the first nor the related second radio block is relatively high, the radio channel for the second radio block is selected from the first subset in step S14. Thus, in this low quality situation, the second radio block will be transmitted using a radio channel belonging to the same subset as the radio channel that was used for the first radio block. In addition, all radio blocks (including so-called first radio blocks and second and any subsequent radio blocks) of a LLC frame is preferably transmitted on radio channels belonging to the same subset. This means that a mobile unit that unfortunately, due to the low experienced quality, did not correctly receive a portion of the LLC frame, e.g. a first radio block and any retransmitted versions thereof, can select to refrain from listening to any remaining radio block belonging to the same LLC frame. Due to the organization of radio channels, the mobile unit knows that in this low quality situation all these remaining radio blocks will be transmitted on radio channels belonging to the same subset. These radio channels can then possibly be better employed by the mobile unit for performing the temporary communications operations than by wasting energy for trying to decode radio blocks of an LLC frame that nevertheless will be regarded as unsuccessfully received.

The method then continues to step S3 of FIG. 2. If the radio link quality subsequently changes (improves or deteriorates) a different selection might be performed in step S12 for a subsequent scheduling occasion.

In the scheduling, it is desirable to select, based on information of the radio channel of a previous radio block, a radio channel for a subsequent radio block based on information common to the previous radio block, which is optimal in some sense. In order to be able to speak about optimality in a well-defined manner, an objective function $f$ is typically introduced. This objective function $f$ is carefully selected and made dependent on i) some given input parameter and some variables that can be carefully selected to optimize the objective function $f$.

The input parameter includes the information of the radio channel of the previous radio block. Other input parameters can also be used, such as the definition of radio channel subset and/or link quality data. The optimization variable and, thus, the output of the objective function $f$ is the radio channel to use for the subsequent radio block.

When formalizing an optimization considering radio channel, the flowing notations may be used:

C denotes the set of all radio channels available for use in the communications session between the network node and the at least one mobile unit.

The objective function $f$ is then, in this illustrative discussion, optimized for selecting a radio channel, using input parameters from the above set C to determine an optimal selected radio channel $\tilde{c}$:

$$\tilde{c} = \arg_{C}\{opt_C\{f\}\} \tag{1}$$

In a first scenario, the only available input parameter is the radio channel used for the previous related radio block. A scheduling criterion may then be based on an objective function $f$ according to:

$$Z_{ij} = f(c_i) \tag{2}$$

where $c_i$, $c_i \in C$, is the radio channel of the previous radio block and $c_j$, $c_j \in C$, is a potential radio channel for the subsequent radio channel. $Z_{ij}$ is optimized with respect to $c_j$ according to the equation (1), i.e. finding the best radio channel $\tilde{c}$.

In a specific embodiment, also information about the definitions of radio channel subsets can be used. For example, assume that the available radio channels are organized into two subsets $C_1$, $C_2$. The objective function $f$ of equation (2) can then be amended according to:

$$Z_{ij} = f(c_i, C_1, C_2) \tag{3}$$

If it is further known that for example $c_i \in C_1$ i.e. that the radio channel used for the previous radio block belongs to the first subset, and that the radio channel of the subsequent radio block should only be selected from the same subset or from the other subset, the objective function $f$ of equation (2) can be applied to the special where $c_j \in C_1$ or $c_j \in C_2$.

As was noted in the foregoing, also link quality data can be used in the selection process. Let $LQ_k$ denote the estimate quality for the communications link between the transmitting network node and mobile unit k. The objective function $f$ of equation (2) can then be amended according to:

$$Z_{ijk} = f(c_i, LQ_k)$$

The same addition of link quality data can of course also be applied to the objective function $f$ as defined by equation (3).

Figure 7:
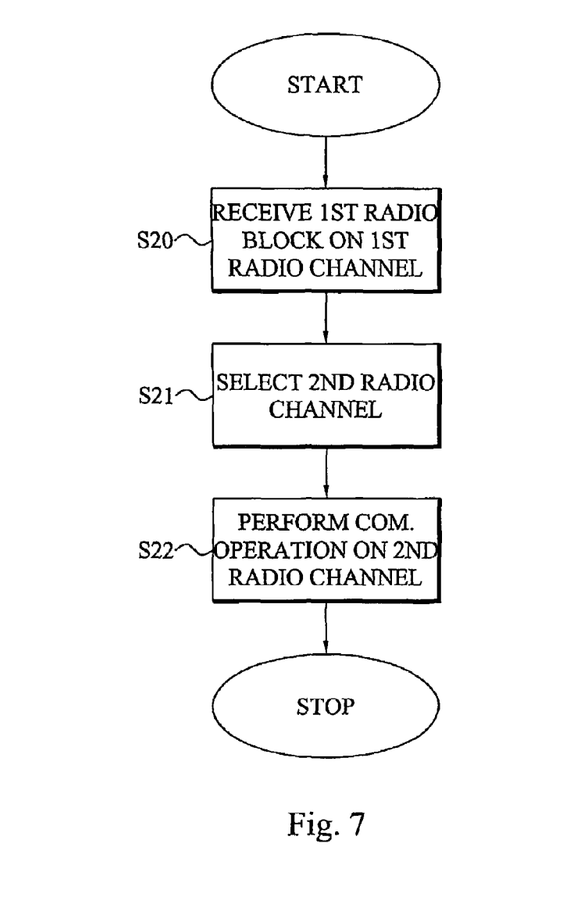
FIG. 7 is a flow diagram of the method of managing a communications session.

FIG. 7 is flow diagram of the method of managing a communications session for a mobile unit. This communications session involves, as seen from the mobile unit, reception of radio blocks carrying e.g. MBMS data. In a first step S20, the mobile unit receives a first radio block from a transmitting network node on a first radio channel. The mobile unit tries to decode this first radio block, e.g. by running a CRC (cyclic redundancy check). In a next step S21, a radio channel is selected, on which a second radio block comprising information that is common to the first and this second radio block is expected to be received. This selection is performed based, at least partly, on the information of the first radio channel, i.e. the radio channel used for the first radio block. This channel selection can be performed by a network node in the communications system, e.g. the network node transmitting the radio blocks or another separate network node. In such a case, a notification of the selected second radio channel is transmitted to the mobile unit. In an alternative implementation, the channel selection is performed both by the mobile unit and a network node. However, in such a case preferably the corresponding selection algorithm is implemented both in the mobile unit and in the network node so that both the mobile unit and the network node will select the same radio channel in step S21.

The mobile unit can then perform, in step S22, any temporary channel-demanding communications operations on the radio channel selected in the step S21. The selection process, thus limits the radio channels, on which the mobile unit potentially can perform any channel-demanding operations during an ongoing communications session, in order to prevent a too high loss of transmitted data and a too low system throughput. The method then ends.

In a first non-limiting, example embodiment, the mobile unit successfully received and decoded the first radio block in the step S20. As a result, an omission of reception of the second radio block will not adversely effect the overall communications session and radio block reception for the mobile unit. The mobile unit, thus, has a free radio channel to use for the temporary operation. In a second embodiment, the mobile unit might already have missed data belonging to a same control frame and/or the mobile unit, based on the (failed) CRC check of the first radio block and possibly current link quality estimates, expects that the information will not be correctly received even when using both the first and second radio block. In such a case, the mobile unit could refrain from listening to the radio channel, on which the second radio block will be received (and also other radio channels used for any remaining radio blocks of the same LLC frame) and instead perform another communications operation.

If the temporary communications operation is expected to last or require X radio channels, the mobile unit preferably uses X radio channels, during which the network node will retransmit versions of radio block that the mobile unit already has successfully received. Alternatively, or in addition, the X radio channels can be those radio channels used for radio blocks belonging to an already failed, from the mobile unit point of view, LLC frame.

Figure 8:
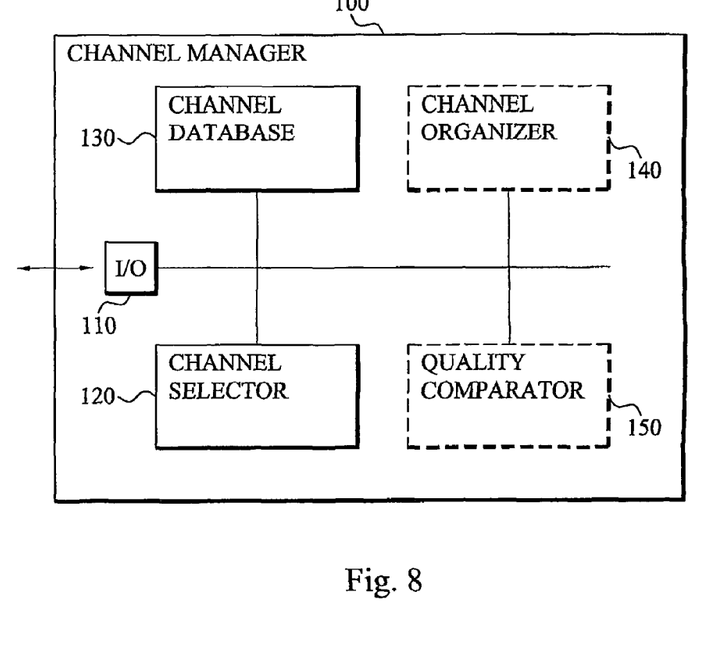
FIG. 8 is a schematic block diagram of a channel manager.

FIG. 8 is a schematic block diagram of a channel manager 100. The channel manager 100 includes an input and output (I/O) unit 110 for conducting communication with external units. This I/0 unit 110 could, in particular, be adapted for transmitting radio channel information to a network node performing transmissions of radio block, if not implemented therein, and/or to mobile units, possibly via a base station communicating with the mobile units. A channel database 130 is implemented in the channel manager 100 or at least accessible for the channel manager 100, in the case of an external implementation of the database 130. This channel database 130 stores information or identifiers of the radio channels available for different communications sessions. The database 130 can also store information of radio channels that previously has been used for transmitting radio blocks in a particular communications session.

The channel manager 100 further includes a channel selector 120 that selects, e.g. from the radio channels notified in the database 130, a radio channel to use for a radio block that is based on information common to the radio block and a previous radio block already transmitted in the communications session. The channel selector 120 uses information of the radio channel used for this previous radio block, e.g. as provided from the channel database 130, in this channel selection process. The channel selector 120 could be implemented for optimizing an object function having the information of the radio channel used for the previous radio block as input parameter and outputting an optimal/suitable radio channel to use for the subsequent radio block. Information of the selected radio channel is preferably notified using the I/O unit 110 to the relevant mobile unit(s) and/or the base station communicating with the mobile unit(s).

An optional channel organizer 140 can be implemented in the channel manager 100 for defining subsets of the radio channels involved in a communications session, e.g. as determined using the channel database 130. This channel organizer 140 preferably organizes the available channel resources into at least a first and a second subset that can include the same or different numbers of radio channels. The channel organizer 140 could be configured for (dynamically) updating the channel subset definition based on input information, including e.g. radio channel availability, radio quality data and/or mobile unit related information. The channel subset definition and any redefinitions are notified to the channel selector 120. This selector 120 will then use the subset definition in combination of the information of the radio channel of the previous radio block when selecting an optimal/suitable radio channel for the subsequent radio block.

The channel manager 100 may optionally also include a quality comparator 150 that receives link quality data from mobile units and/or from base stations involved in the communication session. This quality data is then processed by the quality comparator 150, preferably by comparing the quality data with quality threshold(s). The result from such a quality data processing is forwarded to the channel selector 120 and is used in the selection process 120. In such a case, the channel selector 120 preferably uses the quality related input from the comparator 150 to select the relevant radio channel from either the same or another channel subset (the definitions of which are provided by the channel organizer 140) as the previous radio channel.

The units 110, 120, 140 and 150 of the channel manager 100 may be provided as software (e.g., used to control a general purpose computer), hardware or a combination thereof. The units 110 to 150 may be implemented together in the channel manager 100 in a single network node, e.g. a base station node or a base station controller node. Alternatively, a distributed implementation is also possible with some of the units provided in different network nodes in the communications system.

Figure 9:
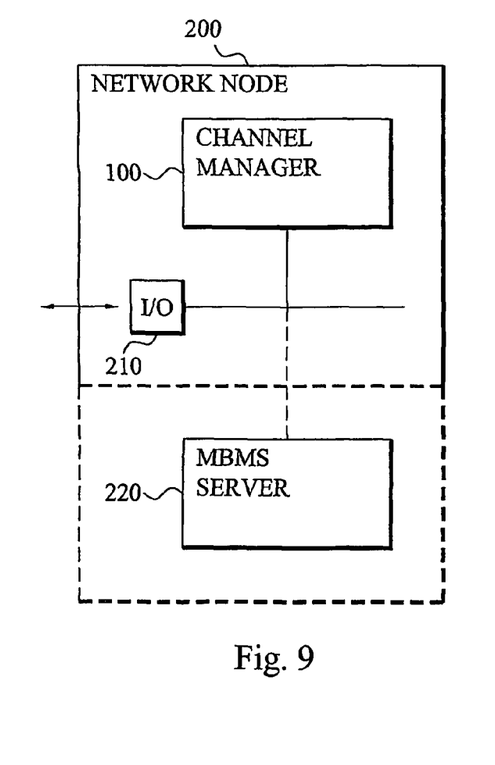
FIG. 9 is a schematic block diagram of a network node comprising a channel manager.

FIG. 9 is a schematic block diagram of a portion of a network node 200. The network node 200 includes a channel manager 100 for scheduling transmission of radio blocks during a communications session in such a way that mobile units participating in the session can temporarily perform other channel-demanding communications operations with reduced loss of data for the session due to the communications operations. This channel manager 100 corresponds to the channel manager 100 described above in connection with FIG. 8 and is not further discussed herein.

In a first embodiment, the network node 200 is a control node or dedicated scheduling node that does not directly participate in the communications session with the mobile units. For example, the network node 200 could be a base station control node or some other control node in the radio access network. The network node 200 then manages scheduling and selection of suitable radio channels on behalf of one or more base stations in the communications system. A notification of a selected radio channel as determined by the channel manager 100 is then forwarded using an I/O unit 210 of the network node 200 to the relevant base station. The radio channel notification can also be forwarded by the I/O unit 210 to the mobile units communicating with the base station, but this notification is typically conducted via the base station.

In a second embodiment, the network node 200 is a base station actively participating in the communications session and transmits radio blocks to connected mobile units. The network node 200 then preferably, includes, or at least has access, via a wired or wireless connection, to a data transmit buffer providing the information to be transmitted in radio blocks to the mobile units. In FIG. 9, this transmit buffer is represented by a MBMS server 220 housing broadcast/multicast data that will be transmitted using the I/O unit 210 to the mobile unit on radio channels selected by the channel manager 100.

Figure 10:
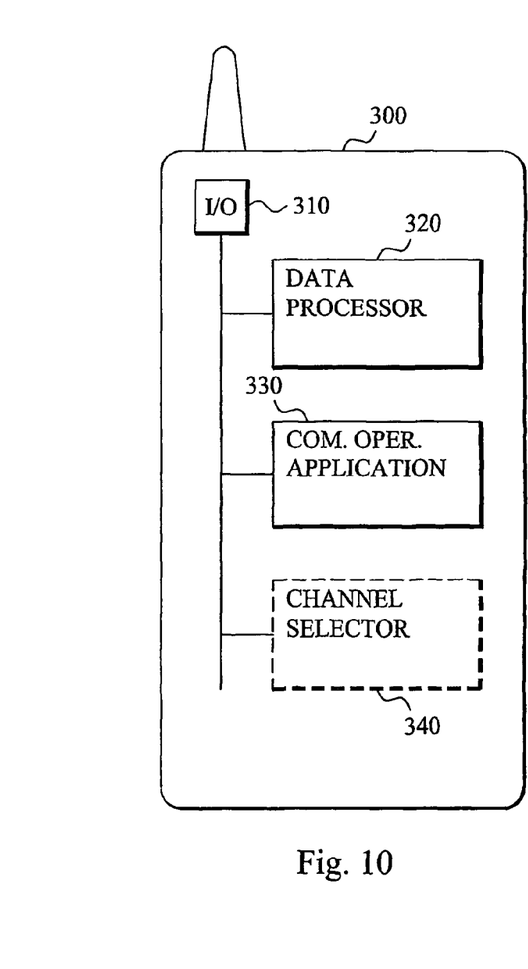
FIG. 10 is a schematic block diagram of a mobile unit according to the present invention.

FIG. 10 is a schematic block diagram of a mobile unit 300. The mobile unit 300 includes an I/O unit 310 for communication with external units. This I/O unit 310 is in particular adapted for receiving radio blocks from a connected base station. The I/O unit 310 is further used by the mobile unit 300 when performing any channel-demanding communications operations during a communications session with the base station. In an example embodiment, the I/O unit 310 also receives radio channel notifications from an external network node, e.g. the base station, that indicate radio channels that are suitable for performing any channel-demanding operations during an ongoing session with no or minimized loss of useful data.

The mobile unit 300 further includes a data processor 320 that processes received and transmitted data. Thus, the data processor 320 typically includes modulator/demodulator and coder/decoder functionalities. The processor 320 is in particular used for determining whether a received radio block can be correctly decoded, e.g. by running a CRC check.

An application 330 for performing channel-demanding communications operations is included in the mobile unit 300 for performing any communications operations during an ongoing session on those radio channels notified by the external unit (or determined by the mobile unit 300 itself, see below). This application 330 could be implemented for setting up a temporary block flow, by e.g. sending, using the I/O unit 310, an SMS, MMS or email message. Alternatively, the application 330 could initiate and conduct a WAP interaction on the selected and notified radio channels. In a further embodiment, the application 300 includes functionalites for listening to control channels or for performing quality measurements.

The application 330 or some other unit in the mobile unit 300 could evaluate the decoding data from the data processor 320 to schedule on which of the notified radio channels it might be best to perform any channel-demanding communications operations. For example, suitable notified radio channels include those radio channels which will carry a radio block containing payload information that the mobile unit 300 already has received and the data processor 320 correctly has decoded. Further examples include notified radio channels used for transmitting radio blocks belonging to an LLC frame, which the data processor 320 already regards as failed due to incorrect reception of previously transmitted information belonging to the LLC frame.

As was noted above, the radio channels on which the application 330 should conduct any communications operations could be notified from e.g. the base station. Alternatively, the mobile unit 300 includes a channel selector 340 that selects a suitable radio channel based on information of a radio channel on which a previous radio block was received. This channel selected 340 basically operates similar to the channel selector of the channel manager described above in connection with FIG. 8. In the case of a dedicated channel selector 340 both in the mobile unit 300 and in the external channel manager, these two channel selectors preferably operate using a same selection algorithm. This means that the radio channel selected by the channel selector of the channel manager based on information of a previous radio channel will be the same radio channel as selected by the channel selector 340 of the mobile unit 300 in the case of the same input information. In this embodiment, no notifications of selected radio channels have to be communicated between the participating base station and mobile units.

The units 310 to 340 of the mobile unit 300 may be provided as software (e.g., used to control a general purpose computer), hardware or a combination thereof.

It will be understood by a person skilled in the art that various modifications and changes may be made without departure from the scope of the appended claims.

REFERENCES

[1] 3GPP TS 43.246, version 6.1.0: $3^{rd}$ Generation Partnership Project; Technical Specification Group GSM/EDGE Radio Access Network; Multimedia Broadcast Multicast Service (MBMS) in the GERAN; stage 2 (Release 6), November 2004.

The invention claimed is:

1. A method of enabling, during an ongoing communications session involving transmission of radio blocks to a mobile unit on a set of multiple available time slots, other temporary channel-demanding communications for said mobile unit, said method comprising:
    selecting a time slot from said time slot set for transmitting a radio block in a subsequent time slot frame containing information of a previous time slot on which a previous radio block has been transmitted to and received at said mobile unit in a previous time slot frame,
    wherein the information contained in the radio block in the subsequent time slot frame is the same as or is derivable from the information contained in the radio block in the previous time slot frame, and
    wherein said mobile unit performs said other temporary channel-demanding communications on said selected time slot in the subsequent time slot frame with reduced probability of loss of data for said communications session.

2. The method according to claim 1, further comprising transmitting said radio block on said selected time slot.

3. The method according to claim 1, wherein said selecting step comprises selecting said time slot based on said information and based on quality data representing the quality of a communications link between said mobile unit and a network node transmitting said radio blocks.

4. The method according to claim 3, further comprising:
    organizing said multiple radio channels of said set into at least a first time slot subset and a second time slot subset, wherein said previous time slot belongs to said first subset; and
    comparing said quality data with a minimum quality threshold,
    wherein said selecting step comprises i) selecting said time slot from said second subset based on said information if said quality data exceeds said minimum quality threshold and ii) selecting said time slot from said first subset based on said information if said quality data is smaller than said minimum quality threshold.

5. The method according to claim 1, further comprising organizing said multiple time slots of said set into at least a first time slot subset and a second time slot subset, wherein said previous time slot belongs to said first subset, and said selecting step comprises selecting said time slot from said second subset based on said information.

6. The method according to claim 1, further comprising organizing said multiple time slots of said set into at least a first time slot subset and a second time slot subset, wherein said previous time slot belongs to said first subset, and said selecting step comprises selecting said time slot from said first subset based on said information.

7. The method according to claim 6, wherein radio blocks are grouped into block frames, each block frame comprises multiple radio blocks and is assigned a time slot subset selected from said at least first and second subset, said selecting step comprises the steps of:
identifying a time slot subset assigned to a block frame to which said radio block belongs based on said information; and
selecting said time slot from said identified radio channel subset.

8. A method of managing a communications session involving reception of radio blocks by a mobile unit on a set of multiple available time slots, said method comprising:
said mobile unit performing other time slot-demanding communications, during said communications session, on a time slot in a subsequent time slot frame on which a radio block is expected to be received, where said time slot is selected based on information contained in a previous time slot on which a previous radio block has been received in a previous time slot frame in order to reduce the probability of loss of data for said communications session,
wherein information contained in the radio block in the subsequent time slot frame is the same as or is derivable from the information contained in the radio block in the previous time slot frame.

9. The method according to claim 8, further comprising said mobile unit receiving said information from a network node transmitting said radio blocks.

10. The method according to claim 8, wherein said previous radio block has been successfully received by said mobile unit.

11. The method according to claim 1, wherein said temporary communications comprise at least one of:
said mobile unit setting up a temporary block flow;
said mobile unit listening to a control channel time slot; and
said mobile unit performing neighbor cell signal measurements.

12. The method according to claim 11, wherein said temporary block flow comprises at least one of:
said mobile unit sending a data message; and
said mobile unit performing a wireless application protocol interaction.

13. The method according to claim 1, wherein said ongoing communications session is a multimedia broadcast multicast communications session.

14. The method according to claim 1, wherein said radio block comprises the same information bits as said previous radio block.

15. A system for enabling, during an ongoing communications session involving transmission of radio blocks to a mobile unit on a set of multiple available time slots, other temporary channel-demanding communications for said mobile unit, said system comprising one or more processing units configured to:
select a time slot from said time slot set for transmitting a radio block based on information contained in a previous time slot on which a previous radio block has been transmitted to and received at said mobile unit in a previous time slot frame, said information contained in the radio block is the same as or is derivable from the information contained in the previous radio block to enable said mobile unit to perform said other temporary channel-demanding communications on said selected time slot with reduced probability of loss of data for said communications session.

16. The system according to claim 15, wherein said one or more processing units is configured for selecting said time slot based on said information and based on quality data representing the quality of a communications link between said mobile unit and a network node transmitting said radio blocks.

17. The system according to claim 16, wherein the one or more processing units are configured to:
organize said multiple time slots of said set into at least a first time slot subset and a second time slot subset, wherein said previous time slot belongs to said first subset; and
compare said quality data with a minimum quality threshold,
i) select said time slot from said second subset based on said information if said quality data exceeds said minimum quality threshold and ii) select said time slot from said first subset based on said information if said quality data is smaller than said minimum quality threshold.

18. The system according to claim 15, wherein the one or more processing units is configured to organize said multiple time slots of said set into at least a first time slot subset and a second time slot subset, wherein said previous time slot belongs to said first subset, and select said time slot from said second subset based on said information.

19. The system according to claim 15, wherein the one or more processing units is configured to organize said multiple time slots of said set into at least a first time slot subset and a time slot subset, wherein said previous time slot belongs to said first subset, and to select said time slot from said first subset based on said information.

20. The system according to claim 19, wherein radio blocks are grouped into block frames, each block frame comprises multiple radio blocks and is assigned a time slot subset selected from said at least first and second subset, wherein the one or more processing units is configured to:
identify a time slot subset assigned to a block frame to which said radio block belongs based on said information; and
select said time slot from said identified time slot subset.

21. A network node comprising:
a system for enabling, during an ongoing communications session, other temporary channel-demanding communications for a mobile unit according to claim 15; and
a transmitter for transmitting said radio block on said selected time slot.

22. A mobile unit arranged for conducting a communications service, involving reception of radio blocks on a set of multiple available time slots, with a network node in a communications system, said mobile unit comprising:
a receiver for receiving a previous radio block from said network node on a previous time slot of said time slot set; and
one or more processing units configured to perform other channel-demanding communications, during said communications session, on a time slot on which a radio block is expected to be received from said network node in a subsequent time frame, where said time slot is selected based on information contained in said previous time slot on which said previous radio block has been received by said receiver in a previous time slot frame in order to reduce the probability of loss of data for said communications session, wherein information contained in the radio block in the subsequent time slot frame is the same as or is derivable from the information contained in the radio block in the previous time slot frame.

23. The mobile unit according to claim 22, wherein said previously radio block has been successfully received by said receiver.

24. The mobile unit according to claim 22, wherein said radio block is a retransmitted version of said previous radio block.

25. The mobile unit according to claim 22, wherein said receiver is configured for receiving a notification of said time slot from said network node.

26. The mobile unit according to claim 22, further comprising means for selecting said time slot based on said information.

* * * * *

UNITED STATES PATENT AND TRADEMARK OFFICE
CERTIFICATE OF CORRECTION

PATENT NO. : 8,135,003 B2
APPLICATION NO. : 11/919800
DATED : March 13, 2012
INVENTOR(S) : Axnas It is certified that error appears in the above-identified patent and that said Letters Patent is hereby corrected as shown below:

In the Drawings

In Fig. 5B, Drawing Sheet 3 of 7, delete " " and insert -- --, therefor.

In the Specifications

In Column 3, Line 36, delete "flow," and insert -- flow --, therefor.

In Column 10, Line 59, delete "TSI" and insert -- TS1 --, therefor.

In Column 11, Line 2, delete "TSI" (1$^{st}$ occurrence) and insert -- TS1 --, therefor.

In Column 11, Line 2, delete "TSI" (2$^{nd}$ occurrence) and insert -- TS1 --, therefor.

In Column 13, Line 57, delete "and" and insert -- and ii) --, therefor.

Signed and Sealed this
Sixteenth Day of April, 2013

Teresa Stanek Rea
*Acting Director of the United States Patent and Trademark Office*